United States Patent
Huang

(10) Patent No.: US 12,530,185 B2
(45) Date of Patent: Jan. 20, 2026

(54) GAME DATA UPDATING METHOD AND SYSTEM, SERVER, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Kailin Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 194 days.

(21) Appl. No.: 18/460,430

(22) Filed: Sep. 1, 2023

(65) Prior Publication Data

US 2023/0409312 A1 Dec. 21, 2023

Related U.S. Application Data

(63) Continuation of application No. PCT/CN2022/098298, filed on Jun. 13, 2022.

(30) Foreign Application Priority Data

Jul. 6, 2021 (CN) .......................... 202110772287.X

(51) Int. Cl.
*G06F 8/65* (2018.01)
*A63F 13/40* (2014.01)
(Continued)

(52) U.S. Cl.
CPC ............... *G06F 8/65* (2013.01); *A63F 13/40* (2014.09); *A63F 13/77* (2014.09); *A63F 13/355* (2014.09)

(58) Field of Classification Search
CPC .. G06F 8/65; A63F 13/40; A63F 13/77; A63F 13/355; A63F 13/533; A63F 13/69
See application file for complete search history.

(56) References Cited

U.S. PATENT DOCUMENTS

| | | | |
|---|---|---|---|
| 2016/0105620 A1* | 4/2016 | Liang | H04N 5/272 348/239 |
| 2017/0050111 A1 | 2/2017 | Perry et al. | |
| 2018/0276797 A1* | 9/2018 | Wu | G06T 15/503 |

FOREIGN PATENT DOCUMENTS

| | | | | |
|---|---|---|---|---|
| CN | 108389241 A | | 8/2018 | |
| CN | 111309357 A | * | 6/2020 | ............. A63F 13/77 |

(Continued)

OTHER PUBLICATIONS

China National Intellectual Property Administration (CNIPA) Office Action for Application No. 202110772287.X Feb. 28, 2025 10 Pages (including translation).

(Continued)

*Primary Examiner* — Daxin Wu
(74) *Attorney, Agent, or Firm* — Anova Law Group, PLLC

(57) ABSTRACT

A game data updating method game data updating includes: running a cloud gaming client mirroring data when a game update needs to be performed, to generate a cloud gaming picture including an update trigger control; obtaining operation coordinates corresponding to the update trigger control; automatically simulating a trigger operation on the update trigger control according to the operation coordinates corresponding to the update trigger control, to generate a trigger instruction for the update trigger control; and updating the cloud gaming client mirroring data according to the trigger instruction.

17 Claims, 5 Drawing Sheets

(51) Int. Cl.
*A63F 13/77* (2014.01)
*A63F 13/355* (2014.01)

(56) References Cited

FOREIGN PATENT DOCUMENTS

| CN | 112221133 | A | | 1/2021 | | |
|---|---|---|---|---|---|---|
| CN | 112245927 | A | * | 1/2021 | | |
| CN | 112988185 | A | * | 6/2021 | | |
| CN | 112999654 | A | | 6/2021 | | |
| CN | 113209633 | A | * | 8/2021 | ............. | A63F 13/77 |
| CN | 113230660 | A | * | 8/2021 | ............. | A63F 13/69 |
| CN | 113467807 | A | | 10/2021 | | |
| EP | 3606051 | A1 | * | 2/2020 | ............. | A63F 13/23 |
| WO | WO-2021258951 | A1 | * | 12/2021 | ............... | G06F 8/63 |

OTHER PUBLICATIONS

The World Intellectual Property Organization (WIPO) International Search Report for PCT/CN2022/098298 Sep. 14, 2022 13 Pages (including translation).

* cited by examiner

GAME DATA UPDATING METHOD AND SYSTEM, SERVER, ELECTRONIC DEVICE, AND STORAGE MEDIUM

CROSS-REFERENCES TO RELATED APPLICATIONS

This application is a continuation application of PCT Patent Application No. PCT/CN2022/098298, entitled "GAME UPDATE METHOD AND SYSTEM, SERVER, ELECTRONIC DEVICE, PROGRAM PRODUCT, AND STORAGE MEDIUM" and filed on Jun. 13, 2022, which claims priority to Chinese Patent Application No. 202110772287.X, entitled "GAME UPDATING METHOD AND SYSTEM, SERVER, ELECTRONIC DEVICE, AND STORAGE MEDIUM" filed with the China National Intellectual Property Administration on Jul. 6, 2021, the entire contents of both of which are incorporated herein by reference.

FIELD OF THE TECHNOLOGY

The present disclosure relates to the field of cloud technology, and in particular, to a game data updating method and system, a cloud gaming server, an electronic device, a program product, and a storage medium.

BACKGROUND OF THE DISCLOSURE

Cloud gaming, which may also be referred to as gaming on demand, is an online gaming technology based on cloud computing technology. The cloud gaming technology enables a thin client with relatively limited graphics processing and data computing capabilities to run high-quality games. In a cloud gaming scene, game software does not run in a player's game terminal, but runs in a cloud gaming server, and the cloud gaming server renders a game scene as a video and audio stream and transmits the video and audio stream to the player's game terminal through the network. The player's game terminal is not required to have a powerful graphics operation and data processing capability, and is only required to have a basic streaming media playing capability and a capability of obtaining a player's input instruction and sending same to the cloud gaming server.

As the version of game software is iteratively updated, a game running in the cloud gaming server also needs to be updated. Presently, an update operation of a game is manually performed, with the need of manually starting a device and loading the game. After an update interface of the game appears, update is manually clicked, thereby realizing update of the game. However, as cloud gaming is developing increasingly, iterative update of the versions of games will become more and more frequent along with increasing categories of released games, and when there are more versions of games, manually performing a tedious operation will reduce the update efficiency of cloud gaming products.

SUMMARY

Embodiments of the present disclosure provide a game data updating method and system, a server, an electronic device, a program product, and a storage medium, so as to complete automatic update of game software, greatly optimize the operation cost and the operation quality of a product through the automatic update of the game, and improve the data processing efficiency of updating the game software.

Other features and advantages of the present disclosure become obvious through the following detailed descriptions or partially learned through the practice of the present disclosure.

According to one aspect of the embodiments of the present disclosure, provided is a game data updating method, executed by an electronic device, and including: running a cloud gaming client mirroring data when a game update needs to be performed, to generate a cloud gaming picture including an update trigger control; obtaining operation coordinates corresponding to the update trigger control; automatically simulating a trigger operation on the update trigger control according to the operation coordinates corresponding to the update trigger control, to generate a trigger instruction for the update trigger control; and updating the cloud gaming client mirroring data according to the trigger instruction.

According to one aspect of the embodiments of the present disclosure, provided is a game data updating system, including a cloud gaming server and a user interface identification server. The cloud gaming server is configured to run, when a game update needs to be performed, a cloud gaming client mirroring data to generate a cloud gaming picture including an update trigger control, and transmit the cloud gaming picture to the user interface identification server. The user interface identification server is configured to identify the update trigger control in the cloud gaming picture, determine operation coordinates corresponding to the identified update trigger control, and transmit the operation coordinates to the cloud gaming server; and the cloud gaming server is further configured to automatically simulate a trigger operation on the update trigger control according to the operation coordinates corresponding to the update trigger control, to generate a trigger instruction for the update trigger control, and update the cloud gaming client mirroring data according to the trigger instruction.

According to one aspect of the embodiments of the present disclosure, provided is an electronic device, including at least one processor and at least one memory, the at least one memory having computer-readable instructions stored thereon, and the computer-readable instructions, when executed by the at least one processor, implementing the game data updating method.

According to one aspect of the embodiments of the present disclosure, provided is a non-transitory computer-readable storage medium, having computer-readable instructions stored thereon, the computer-readable instructions, when executed by at least one processor of a computer, causing the computer to execute the game data updating method.

It is to be understood that, the foregoing general descriptions and the following detailed descriptions are merely for illustration and explanation purposes and are not intended to limit the present disclosure.

BRIEF DESCRIPTION OF THE DRAWINGS

Accompanying drawings herein are incorporated into the description and constitute a part of this description, show embodiments that conform to the present disclosure, and are used for describing a principle of the present disclosure together with this description. Apparently, the accompanying drawings described below are merely some embodiments of the present disclosure, and a person skilled in the art may further obtain other accompanying drawings according to the accompanying drawings without creative efforts. In the accompanying drawings.

DESCRIPTION OF EMBODIMENTS

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the present disclosure. On the contrary, the implementations are merely examples of apparatuses and methods that are described in detail in the appended claims and that are consistent with some aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

"Plurality of" mentioned in the present disclosure means two or more. "And/or" describes an association relationship of associated objects and represents that there may be three relationships. For example, A and/or B may represent: only A, both A and B, and only B. The character "/" generally indicates an "or" relationship between the contextually associated objects.

Cloud computing refers to a delivery and usage mode of an IT infrastructure, which refers to obtaining required resources in an on-demand and easy-to-expand manner over the network. Broadly, cloud computing refers to a delivery and usage mode of services, which refers to obtaining required services in an on-demand and easy-to-expand manner over the network. Such services may be services related to IT, software, and the Internet, or other services. The cloud computing is a product fused and developed by traditional computers and network technologies such as grid computing, distributed computing, parallel computing, utility computing, network storage technologies, virtualization, and load balance.

With the diversified development of the Internet, real-time data streaming, and connection devices, and the promotion of demands such as search services, social networks, mobile commerce, and open collaboration, cloud computing rapidly develops. Unlike parallel distributed computing, the emergence of cloud computing will promote the revolution of the whole Internet mode and enterprise management mode conceptually.

Figure 1:
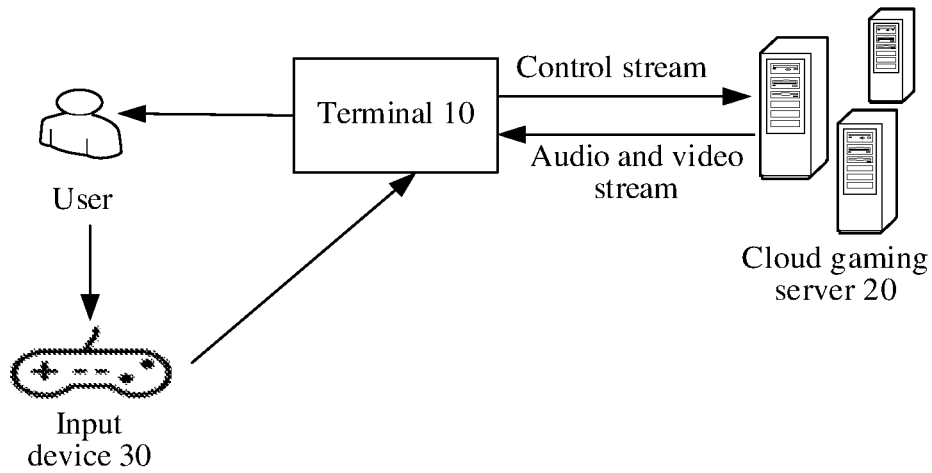
FIG. 1 is a schematic diagram of a cloud gaming architecture.

Cloud gaming is an online gaming technology based on cloud computing technology. FIG. 1 is a schematic diagram of a cloud gaming architecture according to an exemplary embodiment of the present disclosure. The cloud gaming architecture includes a terminal 10 and a cloud gaming server 20, and the terminal 10 communicates with the cloud gaming server 20 through a wired or wireless network.

The cloud gaming server 20 runs a corresponding game, and the game runs in the cloud gaming server 20 in a complete native android application package (APK). The terminal runs a media playing program, which plays an audio and a video corresponding to a game picture.

Through the cloud gaming, logic calculation and picture rendering logic which are originally to be performed in the terminal 10 may be placed in the cloud gaming server 20. After the cloud gaming server 20 calculates and renders the game picture and compresses an instruction, the game picture and the instruction are transmitted to the terminal 10 over the network. The terminal 10 only needs to perform simple decoding and picture display, and transmits a device instruction in the terminal 10 to the cloud gaming server 20. The terminal 10 may support access to an input device 30 to generate the device instruction.

The terminal 10 may be a smartphone, a tablet computer, a laptop computer, a desktop computer, or the like, but is not limited thereto. The cloud gaming server 20 is a cloud server that provides basic cloud computing services such as cloud services, cloud databases, cloud computing, cloud functions, cloud storage, network services, cloud communications, middleware services, domain name services, security services, content delivery networks (CDN), and big data and artificial intelligence platforms. The input device 30 may be a keyboard, a mouse, a gamepad, or the like, which is not limited herein.

Figure 2:
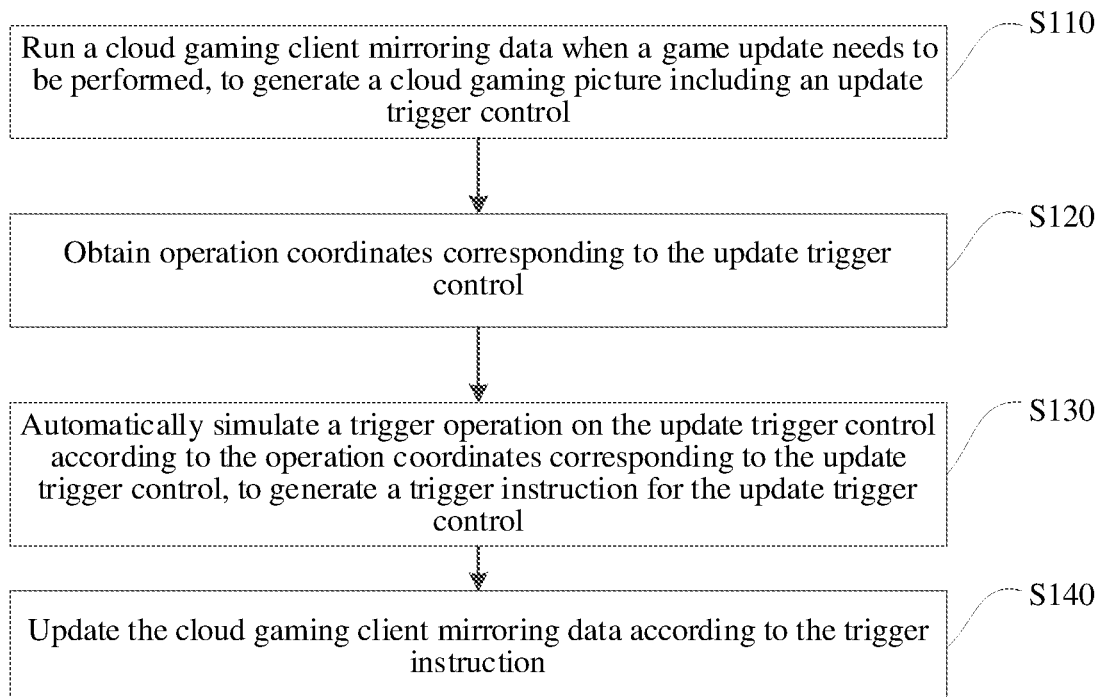
FIG. 2 is a flowchart of a game data updating method according to an embodiment of the present disclosure.

FIG. 2 is a flowchart of a game data updating method according to an embodiment of the present disclosure. The method may be, for example, applied to an implementation environment shown in FIG. 1, and executed in an electronic device such as the cloud gaming server 20 of FIG. 1.

As shown in FIG. 2, in an exemplary embodiment, the game data updating method may include steps S110-S140. A detailed description is as follows:

S110: Run a cloud gaming client mirroring data when a game update needs to be performed, to generate a cloud gaming picture including an update trigger control.

The cloud gaming client mirroring data mentioned in this embodiment is a game image (also called game mirroring data) running in the cloud gaming server, including a basic operating system and a game package. In order to adapt to operating systems of different terminals, the operating systems may be divided into an Android operating system, an iOS operating system (a mobile operating system developed by Apple Inc.), etc. so that a game picture calculated and rendered by the cloud gaming server can fully match terminals of different operating systems. After the cloud gaming client mirroring data runs in the cloud gaming server, there may be complete content generated in the running process of a corresponding game, and a cloud gaming picture may be generated. When a game update is performed, a cloud gaming picture including an update trigger control may be generated. The update trigger control may be an application component, for example, an "update" button, and the update trigger control may also be an area, for example, an area including update text prompt information and a button.

S120: Obtain operation coordinates corresponding to the update trigger control.

The operation coordinates corresponding to the update trigger control mentioned in this embodiment are a position of the update trigger control in the cloud gaming picture, for example, in a game updated cloud gaming picture, the upper left corner is an origin, coordinates of each pixel point includes an abscissa and an ordinate, and the coordinates of the pixel point corresponding to the update trigger control are operation coordinates. In other words, the operation coordinates may represent an area corresponding to the update trigger control.

S130: Simulate automatically a trigger operation on the update trigger control according to the operation coordinates corresponding to the update trigger control, to generate a trigger instruction for the update trigger control.

The cloud gaming server may learn a position of the update trigger control in the cloud gaming picture according to the operation coordinates corresponding to the update trigger control, then controls the position, and simulates a trigger operation of triggering the update trigger control in the cloud gaming picture. That is, virtualization of truly triggering the update trigger control is performed, a control trigger operation of a person is simulated instead of an actual operation of a user/administrator, and then a trigger instruction for clicking the update trigger control in the cloud gaming picture is accurately generated according to the trigger operation. For example, if the "update" button is located at the middle position in the cloud gaming picture, then the trigger operation corresponding to the position is simulated, and a trigger instruction for clicking the middle position is generated. The trigger operation may be a single click, a double click, a long press, a heavy press, or a slide, and the trigger instruction may be a single click instruction, a double click instruction, a long press instruction, a heavy press instruction, and a slide instruction, which are not limited thereto. In an embodiment, simulating the trigger operation may further be simulating a voice operation, for example, automatically playing a voice of "click update button" to trigger the update button.

S140: Update the cloud gaming client mirroring data according to the trigger instruction.

The trigger instruction is used for instructing to automatically update the cloud gaming client mirroring data. For example, when a single click of the "update" button is simulated, the "update" button is automatically pressed to generate the trigger instruction. After the trigger instruction is generated, the cloud server updates the cloud gaming client mirroring data directly without manual operation. In some embodiments, after the trigger instruction is generated, the cloud server stores the trigger instruction, and when the cloud server runs the trigger instruction, the cloud server updates the cloud gaming client mirroring data. The cloud gaming client mirroring data may be updated according to cloud gaming update content. The cloud gaming update content is game update content not included in the cloud gaming client mirroring data, and may be cloud gaming update content generated by a game application server. For example, the content included in the currently running cloud gaming client mirroring data is A, the content of a new version of game is B, the cloud gaming update content is (B-A), and then the content of an updated cloud gaming client mirroring data is B. The update of the cloud gaming client mirroring data is a game update.

In this embodiment, the cloud gaming server runs the cloud gaming client mirroring data to generate a cloud gaming picture including the update trigger control, and the operation coordinates corresponding to the update trigger control in the cloud gaming picture may be obtained. The trigger operation of the update trigger control is simulated through the operation coordinates, and the trigger instruction is automatically generated, so that the generated trigger instruction may be used for replacing manual operation, the cloud gaming server may realize automatic update of the cloud client mirroring according to the trigger instruction, and manual complicated operation is avoided. Moreover, compared with the related art in which updating is performed by means of a real electronic device (that is, manually starting an electronic device, instructing a cloud gaming server to load a game by means of the electronic device, and after an update interface of game software appears in the electronic device, manually clicking an update control so as to instruct the cloud gaming server to update the game), the technical solution provided in the embodiments of the present disclosure realizes automatic update in the cloud gaming server without manual operation, and the use cost is lower and the operation is more flexible. On this basis, in the embodiments of the present disclosure, by automatically updating the cloud gaming client mirroring data in the cloud gaming server, an operation of waiting for a user to update software is avoided, and the data processing efficiency of the server for software update may be improved.

Figure 3:
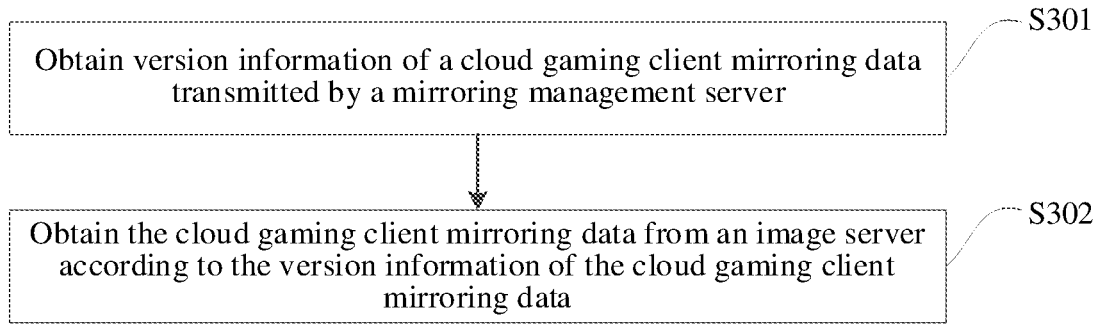
FIG. 3 is a flowchart of a game data updating method according to an embodiment of the present disclosure.

FIG. 3 is a flowchart of an exemplary embodiment before step S110 in the embodiment shown in FIG. 2. As shown in FIG. 3, before the running a cloud gaming client mirroring data, the game data updating method further includes the following steps:

S301: Obtain version information of the cloud gaming client mirroring data transmitted by a mirroring management server.

The mirroring management server is configured to manage a version of the cloud gaming client mirroring data, which specifically includes but is not limited to: initiating an update of the cloud gaming client mirroring data, and recovering an old-version cloud gaming client mirroring data, etc. The version information of the cloud gaming client mirroring data is an identity of the cloud gaming client mirroring data, and the version information of the cloud gaming client mirroring data of different games is different. In this embodiment, the cloud gaming server directly receives the version information of the cloud gaming client mirroring data transmitted by the mirroring management server, that is, the cloud gaming server directly communicates with the mirroring management server to obtain the version information.

S302: Obtain the cloud gaming client mirroring data from an image server (also called game mirroring data server) according to the version information of the cloud gaming client mirroring data.

The image server is configured to store the cloud gaming client mirroring data and store other images. In this embodiment, step S302 specifically includes transmitting the version information of the cloud gaming client mirroring data to the image server, so that the image server searches the cloud gaming client mirroring data corresponding to the version information of the cloud gaming client mirroring data, and then returns the cloud gaming client mirroring data to the cloud gaming server. In an embodiment, step S302 specifically includes: the cloud gaming server, according to the version information of the cloud gaming client mirroring data, directly performs query and performs version matching in the image server, and when the version matching is successful, the cloud client mirroring of which the version is matched is directly pulled from the image server.

The mirroring management server manages the cloud gaming client mirroring data, and the cloud server obtains the corresponding cloud gaming client mirroring data from the mirroring management server according to the version information of the cloud gaming client mirroring data, so as to ensure the accuracy of the cloud gaming client mirroring data running in the cloud server.

In this embodiment, after the updating the cloud gaming client mirroring data, the game data updating method further includes the following steps. After the update is completed, an updated cloud gaming client mirroring data is packaged. For example, the updated cloud gaming client mirroring data may be packaged into a new image. A packaged cloud gaming client mirroring data (i.e., a new image) is transmitted to the image server. The image server may store the new image.

In order to facilitate subsequent fast entry into a new version of game by a player, after the update is completed, the updated cloud gaming client mirroring data is packaged into a new image and then transmitted to the image server. The cloud gaming client mirroring data running in the cloud gaming server may be packaged into a new image by means of virtualization container software (such as docker). When the new image is run next time, the cloud gaming server uses a game image that has been updated, and a player's terminal may directly enter the game, and experience the new version of game, thereby realizing better user experience. Moreover, the new image is pushed to the image server, which is also convenient for other devices to obtain the updated image.

Figure 4:
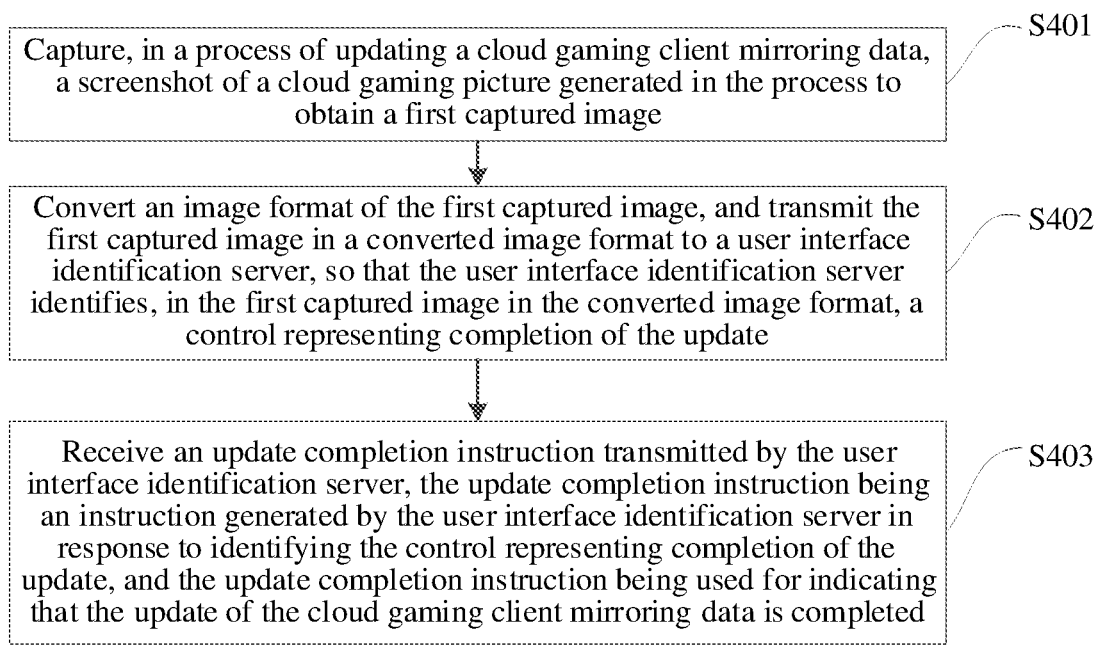
FIG. 4 is a flowchart of a game data updating method according to an embodiment of the present disclosure.

In this embodiment, it is necessary to ensure that the update of the cloud gaming client mirroring data is completed. As shown in FIG. 4, before packaging the updated cloud gaming client mirroring data into a new image, the game data updating method further includes the following steps:

S401: Capture, in a process of updating the cloud gaming client mirroring data, a screenshot of the cloud gaming picture generated in the process to obtain a first captured image.

In the process of updating the cloud gaming client mirroring data, the cloud gaming client mirroring data also runs in the cloud server, and the cloud gaming picture in the updating process is generated in real time. Capturing a screenshot of the cloud gaming picture may be capturing a screenshot of the cloud gaming picture in real time, or may be capturing a screenshot of the cloud gaming picture according to a preset time interval, for example, a screenshot of the cloud gaming picture is captured every 2 s. The first captured image in this embodiment is not necessarily a certain specific screenshot, and may be a captured image set including one or more images.

In an embodiment, in the game data updating process, the cloud gaming picture displays a picture specific to the updating process, for example, the cloud gaming picture may include an update progress bar. In order to avoid the number of excessive times of image capture, the cloud gaming picture may be captured according to the update progress bar. When the update progress bar in the cloud gaming picture generated in the process reaches a first progress, a screenshot of the cloud gaming picture generated in the process is captured according to a preset time interval, and when the update progress bar reaches a second progress, a screenshot of the cloud gaming picture generated in the process is captured in real time to obtain a first captured image. For example, the first progress is 80%, and the second progress is 90%. The first captured image is a captured image set including one or more images. For example, when the update progress bar reaches the first progress of 80%, the cloud gaming picture is captured every 2 s. When the update progress bar reaches the second progress of 90%, the cloud gaming picture is captured in real time to obtain a first captured image. The first captured image may be a captured image set including one or more images.

S402: Convert an image format of the first captured image, and transmit the first captured image in a converted image format to a user interface identification server, so that the user interface identification server identifies, in the first captured image in the converted image format, a control representing completion of the update. In some embodiments, the user interface identification server may be executed on a same device as the cloud gaming server. In some embodiments, the user interface identification server may be a UI automation system in communication with a container (e.g., Android container) of the cloud gaming server.

In this embodiment, in order to avoid the number of excessive times of transmissions of the images, the image format of the first captured image may be transcoded in batches, for example, for each set of five captured images, the image formats of the five captured images are converted. The image format of the first captured image is converted to adapt to image transmission in various forms, and it is also convenient for the user identification server to identify various images. Conversion of the Base64 image format may be performed, for example, an image format such as PNG, GIF, and JPG is converted into Base64. Base64 is one of encoding modes for transmitting 8 Bit bytecode. Base64 encoding is a process from binary data to characters, and may be used for transmitting long identification information in an HTTP environment. Base64 encoding has unreadability and may be read only after decoding. Therefore, in the process of transmitting the first captured image in the converted the image format to the user interface server, the first captured image is not changed. In this way, in this embodiment of the present disclosure, the security of data transmission may be improved by converting the image format. In an embodiment, the image format of the first captured image may also be converted by Huffman coding, arithmetic coding, or the like. In an embodiment, the control indicating that the update is completed may be a login control or a progress bar (e.g., a 100% progress bar) indicating that the update is completed. The user interface server is configured to identify the login control included in the first captured image in the converted image format or the progress bar indicating that the update is completed.

S403: Receive an update completion instruction transmitted by the user interface identification server, the update completion instruction being an instruction generated by the user interface identification server in response to identifying the control representing completion of the update, and the update completion instruction being used for indicating that the update of the cloud gaming client mirroring data is completed.

When identifying that the first captured image in the converted image format includes the login control, the user interface identification server generates an update completion instruction, the update completion instruction being used for indicating that the update of the cloud gaming client mirroring data is completed. When the cloud game server receives the update completion instruction transmitted by the user interface identification server, it indicates that the update of the current cloud gaming client mirroring data has been determined to be completed, and then the updated cloud gaming client mirroring data which is currently running is packaged into a new image. The login control includes, but is not limited to, a "login" button and account and password input boxes.

In another embodiment, when the user interface identification server identifies that the first captured image in the converted image format includes the update progress bar, and the update progress bar is 100%, it indicates that the game update is completed, and an update completion instruction is generated.

In the process of updating the cloud gaming client mirroring data, the content picture of the cloud gaming client mirroring data is transmitted, in an image manner, to the user interface identification server for identification, thereby ensuring the accuracy and reliability of determining completion of the update of the cloud gaming client mirroring data.

In this embodiment, in step S120, the step of obtaining operation coordinates corresponding to the update trigger control includes:

capturing, in a process of running the cloud gaming client mirroring data, a screenshot of the cloud gaming picture to obtain a second captured image;

converting an image format of the second captured image, and transmitting the second captured image in a converted image format to a user interface identification server, so that the user interface identification server identifies the update trigger control in the second captured image in the converted image format, and determines operation coordinates corresponding to the identified update trigger control; and receiving the operation coordinates corresponding to the update trigger control and transmitted by the user interface identification server.

In this embodiment, in a process of running the cloud gaming client mirroring data, the cloud gaming server captures a screenshot of the cloud gaming picture, which may be capturing a screenshot of the cloud gaming picture in real time, or may be capturing a screenshot of the cloud gaming picture according to a preset time interval, for example, a screenshot of the cloud gaming picture is captured every 2 s. The second captured image in the converted image format in this embodiment is not necessarily a certain specific screenshot, and may be a captured image set including one or more images.

In an embodiment, since the cloud gaming picture including the update trigger control is generally a picture before or after the game is started, in order to avoid the number of excessive times of capture, the cloud gaming picture within a specific time period may be captured, for example, a game picture from a time 00:00 when the games starts to a time 05:00 since the game started may be captured.

The image format of the second captured image is converted to facilitate image transmission. Base64 transcoding may be performed, and an image format such as PNG, GIF, and JPG is converted into Base64. The second captured image in the converted image format is transmitted to the user interface identification server.

In this embodiment, the user interface identification server is further configured to identify an update trigger control included in the second captured image in the converted image format, generate, in response to identifying the update trigger control, operation coordinates corresponding to the update trigger control, and transmit the operation coordinates to the cloud gaming server, so that the cloud gaming server may automatically implement game update according to the operation coordinates.

In an exemplary embodiment, the process of updating the cloud gaming client mirroring data includes:

replacing, according to pre-loaded cloud gaming update content when the trigger instruction is detected, content to be updated included in the cloud gaming client mirroring data.

Before the cloud gaming client mirroring data is updated, the cloud gaming update content is pre-loaded, so as to facilitate subsequent rapid update. In an embodiment, specifically, after the cloud gaming server generates the trigger instruction and before the cloud gaming client mirroring data is updated, the cloud gaming update content is pre-loaded. The cloud gaming update content is game content not included in the cloud gaming client mirroring data, and the game content not included in the cloud gaming client mirroring data is updated.

When the trigger instruction is detected, it indicates that the update trigger control is triggered, for example, when the cloud gaming server clicks an "update" button, the "update" button is triggered, and a click instruction is monitored by the cloud server and an update operation is performed. When the trigger instruction is not executed, the trigger instruction is not monitored, and the cloud gaming client mirroring data is not updated.

The update operation is specifically to replace, according to the pre-loaded cloud gaming update content, the content to be updated included in the cloud gaming client mirroring data, that is, replacing the content to be updated included in the cloud gaming client mirroring data with the cloud gaming update content to update the cloud gaming client mirroring data.

In order to facilitate timely learning of an update state of the cloud gaming client mirroring data by the mirroring management server, the game data updating method further includes: transmitting an update state indicating an update node of the cloud gaming client mirroring data to the mirroring management server. The update state indicates the update node of the cloud gaming client mirroring data. The update node of the cloud gaming client mirroring data may include a cloud gaming server and a user interface identification server to inform the mirroring management server of the position and update step in which the current game update node is located. The update state further includes that the cloud gaming client mirroring data is not updated, is being updated, and has been updated, to implement the notification of the game update process. For example, when the cloud gaming client mirroring data does not start updating, the current update step is that the cloud gaming server runs the cloud gaming client mirroring data, then the update node is located in the cloud gaming server, and the update state in which the current cloud gaming client mirroring data does not start updating is transmitted to the mirroring management server. For another example, when the cloud gaming client mirroring data does not complete updating, the current update step is that when the user interface identification server identifies the update trigger control, the current update state (i.e., the update node is located on the user interface identification server, and the update step is that the user interface identification server identifies the update trigger control, and the current cloud gaming client mirroring data does not complete updating) is transmitted to the mirroring management server.

The update state including the update node of the cloud gaming client mirroring data is transmitted to the mirroring management server, so that the mirroring management server may learn the game update state in a timely manner, so as to manage the game update process. For example, the mirroring management server may also pause the update of the cloud gaming client mirroring data by controlling the cloud server, or end the update of the cloud gaming client mirroring data by controlling the cloud server.

The technical solution of the embodiment shown in FIG. 1 is described from the perspective of the cloud gaming server. The technical solutions of the embodiments of the present disclosure are described below with reference to FIG. 5 and FIG. 6 from the perspective of the game data updating system.

Figure 5:
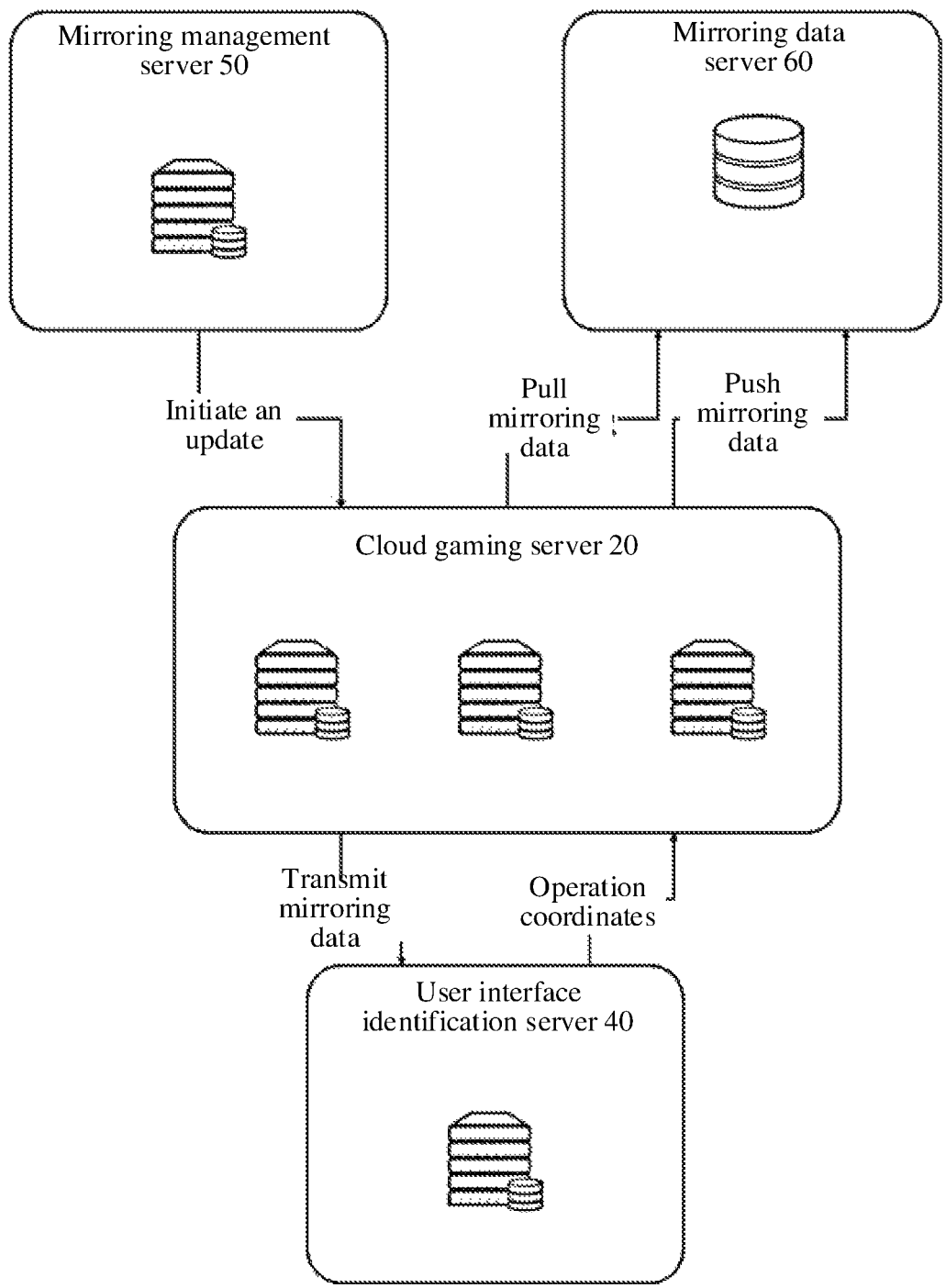
FIG. 5 is a schematic diagram of an architecture of a game data updating system according to an embodiment of the present disclosure.

FIG. 5 is a schematic diagram of an architecture of a game data updating system. The game data updating system includes a cloud gaming server 20, a user interface identification server 40, a mirroring management server 50, and a mirroring data server 60 (e.g., mirroring data repository).

The cloud gaming server runs, when a game update needs to be performed, a cloud gaming client mirroring data to generate a cloud gaming picture including an update trigger control, and transmits the cloud gaming picture to the user interface identification server;

the user interface identification server identifies the update trigger control in the cloud gaming picture, determines operation coordinates corresponding to the identified update trigger control, and transmits the operation coordinates to the cloud gaming server; and the cloud gaming server automatically simulates a trigger operation on the update trigger control according to the operation coordinates corresponding to the update trigger control, to generate a trigger instruction for the update trigger control, and updates the cloud gaming client mirroring data according to the trigger instruction.

In an embodiment, the cloud gaming server 20 includes a system container, such as an Android container. The Android container is a container of an Android system rendered by a cloud of cloud gaming, and an Android operating system and a corresponding game run in the container. A user terminal transmits an operation to the Android container by operating a stream, and the Android container returns a video stream to a local device of the user to complete an interaction process of the cloud gaming. In some embodiments, the Android container in the cloud gaming server 20 pulls the cloud gaming client mirroring data, and runs the cloud gaming client mirroring data, and the cloud gaming picture running in the container is transmitted into the user interface identification server 40. According to the operation coordinates returned by the user interface identification server 40, the Android container generates an operation instruction to realize automatic game update.

In the technical solutions provided in this embodiment, the cloud gaming server runs the cloud gaming client mirroring data, and transmits the cloud gaming picture to the user interface identification server, so that the user interface identification server identifies the update trigger control, and determines operation coordinates corresponding to the identified update trigger control. The cloud gaming server simulates, according to the operation coordinates corresponding to the update trigger control, an operation triggered by a person, generates a trigger instruction, and updates the cloud game to realize automatic update of the game, thereby avoiding manually performing a tedious operation. Game update in the cloud gaming server is performed by means of a real electronic device (that is, manually starting an electronic device, instructing a cloud gaming server to load a game by means of the electronic device, and after an update interface of game software appears in the electronic device, manually clicking an update control so as to instruct the cloud gaming server to update the game), the technical solution provided in the embodiments of the present disclosure realizes automatic update in the cloud gaming server without manual operation, and the use cost is lower and the operation is more flexible. On this basis, in the embodiments of the present disclosure, by automatically updating the cloud gaming client mirroring data in the cloud gaming server, an operation of waiting for a user to update software is avoided, and the data processing efficiency of the server for software update may be improved.

In some embodiments, an execution program may include an update initiation program, a Cloudgame program, a Docker_android program, a picture-capturing program, and a report program. The update initiation program is configured to trigger an update process, identify an idle ARM server, and call a script on the identified ARM server to pull up an Android container to perform the update operation. The Cloudgame program is configured to obtain version and configuration information of game mirroring data; and function as a main process to receive parameters passed from the mirroring management server, parse and store the parameters in memory variables. The Docker_android program is configured to provide operating instructions on an Android container, which includes starting, stopping, deleting, executing commands, and pushing images (i.e., mirroring data) on the Android container. The picture-capturing program is configured to take a screenshot of a game screen of the Android container, perform base64 transcoding, and transmit the transcoded data to an UI automation system. The report program is configured to: generate event notification of the mirroring data update process, and notify the mirroring management server about a current update status and initiation/execution steps of the Android container in the ARM server.

Figure 6:
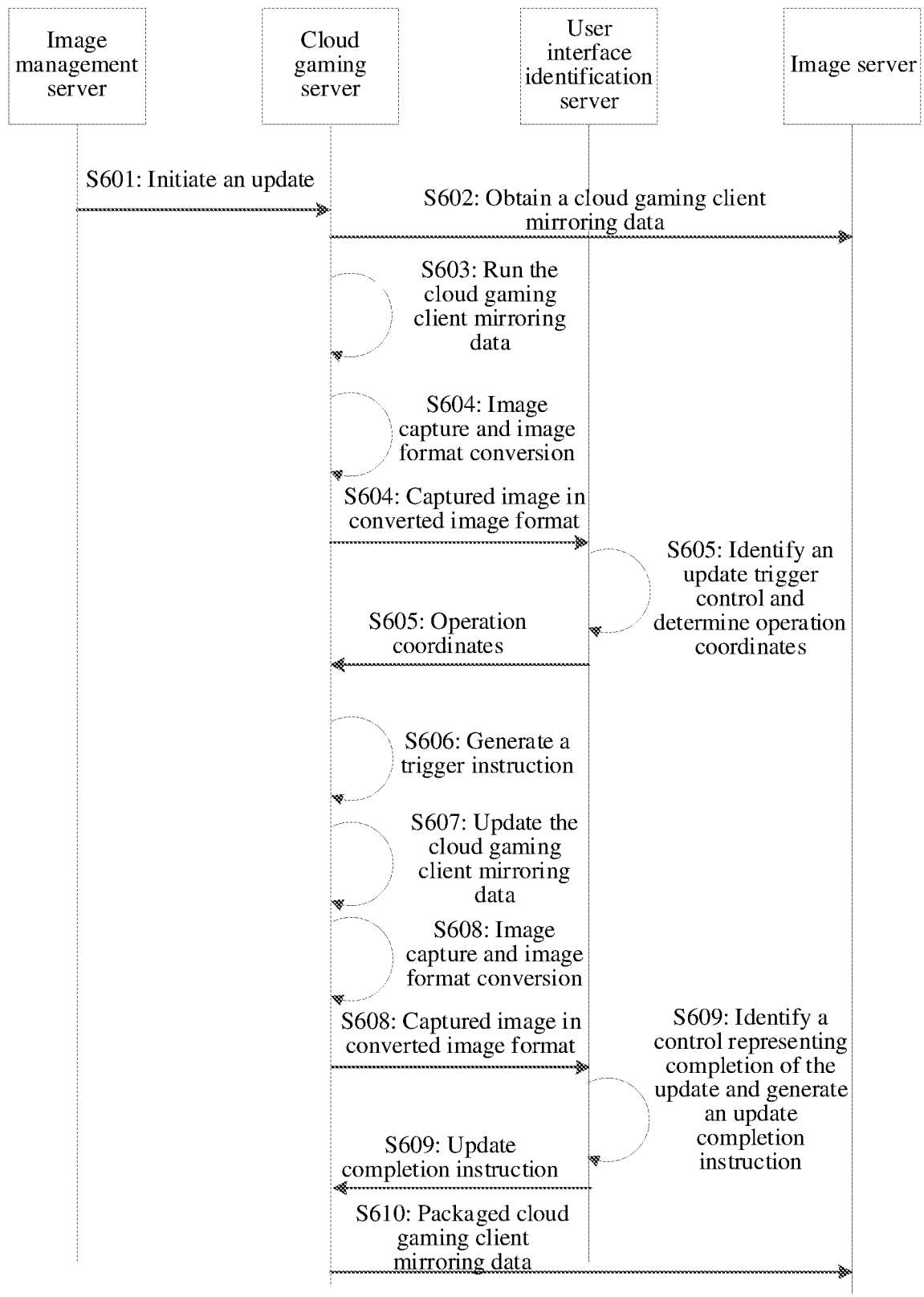
FIG. 6 is a flowchart of a game data updating method according to an embodiment of the present disclosure.

Based on the system shown in FIG. 5, FIG. 6 shows a specific interaction process, including the following steps:

S601: A mirroring management server initiates an update of a cloud gaming client mirroring data, and transmits a cloud gaming client mirroring data version to a cloud gaming server.

When the mirroring management server obtains cloud gaming update content of a certain game, the mirroring management server transmits update information to an idle cloud gaming server, and transmits a cloud gaming client mirroring data version corresponding to the cloud gaming update content.

S602: The cloud gaming server obtains a cloud gaming client mirroring data from an image server according to the cloud gaming client mirroring data version. In some embodiments, the cloud game server may include an ARM server configured to host a system container such as an Android container. In some embodiments, the ARM server may initiate the system container thereon (e.g., based on a script), and the system container may retrieve the cloud gaming client mirroring data from an image repository of the image server.

S603: The cloud gaming server runs, when a game update needs to be performed, the cloud gaming client mirroring data to generate a cloud gaming picture including an update trigger control. In some embodiments, the system container of the cloud gaming server may load and execute the game.

S604: The cloud gaming server (e.g., the system container) captures, in the process of running the cloud gaming client mirroring data, a screenshot of the cloud gaming picture to obtain a captured image, converts an image format of the captured image, and transmits the captured image in the converted image format to the user interface identification server (e.g., a UI automated system of the user interface identification server).

The cloud gaming server captures a screenshot of the cloud gaming picture every 2 s. A complete screenshot is reserved during capture. For each set of five captured images, Base64 format conversion of the five captured images is performed.

S605: The user interface identification server (e.g., the UI automated system) identifies the update trigger control in the captured image in the converted image format, determines operation coordinates corresponding to the update trigger control, and transmits the operation coordinates to the cloud gaming server (e.g., the system container).

In step S605, the user interface identification server identifies the update trigger control in the captured image in the converted image format, which specifically includes the following steps. The user interface identification server obtains, in advance, an interface identifier corresponding to the cloud gaming client mirroring data, and different cloud gaming client mirroring datas have different interface identifiers. When the captured image in the converted image format is identified as an update interface according to the interface identifier, the operation coordinates corresponding to the update trigger control in the update interface are marked. The marking the operation coordinates is specifically to take the upper left corner of the update interface as an origin of a pixel point, obtain an abscissa and an ordinate of the pixel point corresponding to the update trigger control, and take the coordinates of the pixel point as the operation coordinates. The interface identifier is an identifier respectively corresponding to different game interfaces, for example, an interface identifier of an update interface is an "update" icon or text. The user interface identification server identifies the captured image according to the interface identifier, which specifically includes: identifying an interface identifier of the captured image, and matching the obtained interface identifier with the identified interface identifier, so as to identify whether the captured image is an update interface.

In this embodiment, the interface identifier corresponding to the cloud gaming client mirroring data may be transmitted to the cloud gaming server by the mirroring management server, and then transmitted to the user interface identification server by the cloud gaming server.

S606: The cloud gaming server (e.g., the system container) automatically simulates, according to the operation coordinates corresponding to the update trigger control, a trigger operation for the update trigger control, to generate a trigger instruction for the update trigger control.

S607: The cloud gaming server updates the cloud gaming client mirroring data according to the trigger instruction.

S608: The cloud gaming server captures, in the process of running the cloud gaming client mirroring data, a screenshot of the cloud gaming picture to obtain a captured image, converts an image format of the captured image, and transmits the captured image in the converted image format to the user interface identification server.

S609: The user interface identification server identifies, in the captured image in the converted image format, a control representing completion of the update, generates an update completion instruction in response to identifying the control representing completion of the update, and transmits the update completion instruction to the cloud gaming server.

In an embodiment, in step S609, the user interface identification server identifies, in the captured image in the converted image format, a control representing completion of the update, which specifically includes: the user interface identification server matches the interface identifier of the captured image according to the interface identifier of the login interface, when the matching succeeds, it indicates that the captured image is a login interface, and when the captured image is identified as the login interface according to the interface identifier, a login control in the login interface is marked to generate an update completion instruction. The interface identifier of the login interface is a "login" icon or text.

S610: The cloud gaming server (e.g., the ARM server) determines, according to the update completion instruction, that the update of the cloud gaming client mirroring data is completed, packages an updated cloud gaming client mirroring data, and transmits a packaged cloud gaming client mirroring data to the image server (e.g., the image repository). In some embodiments, the ARM server may package, based on a script, the cloud gaming client mirroring data currently executed on the system container as the updated cloud game client mirroring.

In an embodiment, the user interface identification server may also obtain features in the captured image by means of an image recognition technology, for example, determine, by means of optical character recognition (OCR), whether the captured image includes text information such as "update" and "login", and when there is text information such as "update" and "login", it indicates that the captured image is an update interface or a login interface.

The following describes apparatus embodiments of the present disclosure, which may be used for performing the game data updating method in the foregoing embodiments of the present disclosure. For details not disclosed in the apparatus embodiments of the present disclosure, reference may be made to the foregoing game data updating embodiments of the present disclosure.

Figure 7:
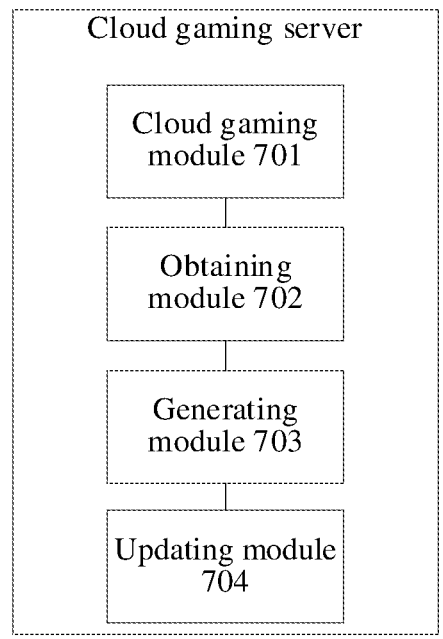
FIG. 7 is a schematic diagram of an architecture of a cloud gaming server according to an embodiment of the present disclosure.

FIG. 7 is a block diagram of a cloud gaming server according to an embodiment of the present disclosure. The cloud gaming server includes a cloud gaming module 701, an obtaining module 702, a generating module 703, and an updating module 704.

The cloud gaming module 701 is configured to run a cloud gaming client mirroring data when a game update needs to be performed, to generate a cloud gaming picture including an update trigger control.

An obtaining module 702 is configured to obtain operation coordinates corresponding to the update trigger control.

A generating module 703 is configured to simulate a trigger operation on the update trigger control according to the operation coordinates corresponding to the update trigger control, to generate a trigger instruction for the update trigger control.

An updating module 704 is configured to update the cloud gaming client mirroring data according to the trigger instruction.

In some embodiments of the present disclosure, on the basis of the foregoing solutions, the cloud gaming server further includes: a pulling module, configured to obtain a cloud gaming client mirroring data version transmitted by a mirroring management server; and obtain a cloud gaming client mirroring data from an image server according to the cloud gaming client mirroring data version.

In some embodiments of the present disclosure, on the basis of the foregoing solutions, the cloud gaming server further includes: a pushing module, configured to package, after the update is completed, an updated cloud gaming client mirroring data; and transmit a packaged cloud gaming client mirroring data to the image server.

In some embodiments of the present disclosure, on the basis of the foregoing solutions, the cloud gaming server further includes: a transmitting module, configured to capture, in a process of updating the cloud gaming client mirroring data, a screenshot of the cloud gaming picture generated in the process to obtain a first captured image; convert an image format of the first captured image, and transmit the first captured image in a converted image format to a user interface identification server, so that the user interface identification server identifies, in the first captured image in the converted image format, a control representing completion of the update; and receive an update completion instruction transmitted by the user interface identification server, the update completion instruction being an instruction generated by the user interface identification server in response to identifying the control representing completion of the update. The update completion instruction is used for indicating that the update of the cloud gaming client mirroring data is completed.

In some embodiments of the present disclosure, on the basis of the foregoing solutions, the obtaining module 702 is specifically configured to capture, in a process of running the cloud gaming client mirroring data, a screenshot of the cloud gaming picture to obtain a second captured image; convert an image format of the second captured image, and transmit the second captured image in a converted image format to a user interface identification server, so that the user interface identification server identifies the update trigger control in the second captured image in the converted image format, and determines operation coordinates corresponding to the identified update trigger control; and receive the operation coordinates corresponding to the update trigger control and transmitted by the user interface identification server.

In some embodiments of the present disclosure, on the basis of the foregoing solutions, the updating module 704 is specifically configured to replace, according to pre-loaded cloud gaming update content when the trigger instruction is detected, content to be updated included in the cloud gaming client mirroring data.

In some embodiments of the present disclosure, on the basis of the foregoing solutions, the cloud gaming server further includes: a notification module, configured to transmit an update state indicating an update node of the cloud gaming client mirroring data to the mirroring management server, the update node of the cloud gaming client mirroring data including a cloud gaming server.

The apparatus provided in the foregoing embodiments and the method provided in the foregoing embodiments belong to the same concept. The specific manner in which each module and unit perform an operation has been described in detail in the method embodiments, and details are not described herein again.

The embodiments of the present disclosure further provide an electronic device, including a processor and a memory, the memory having computer-readable instructions, and the computer-readable instructions, when executed by the processor, implementing the foregoing game data updating method.

Figure 8:
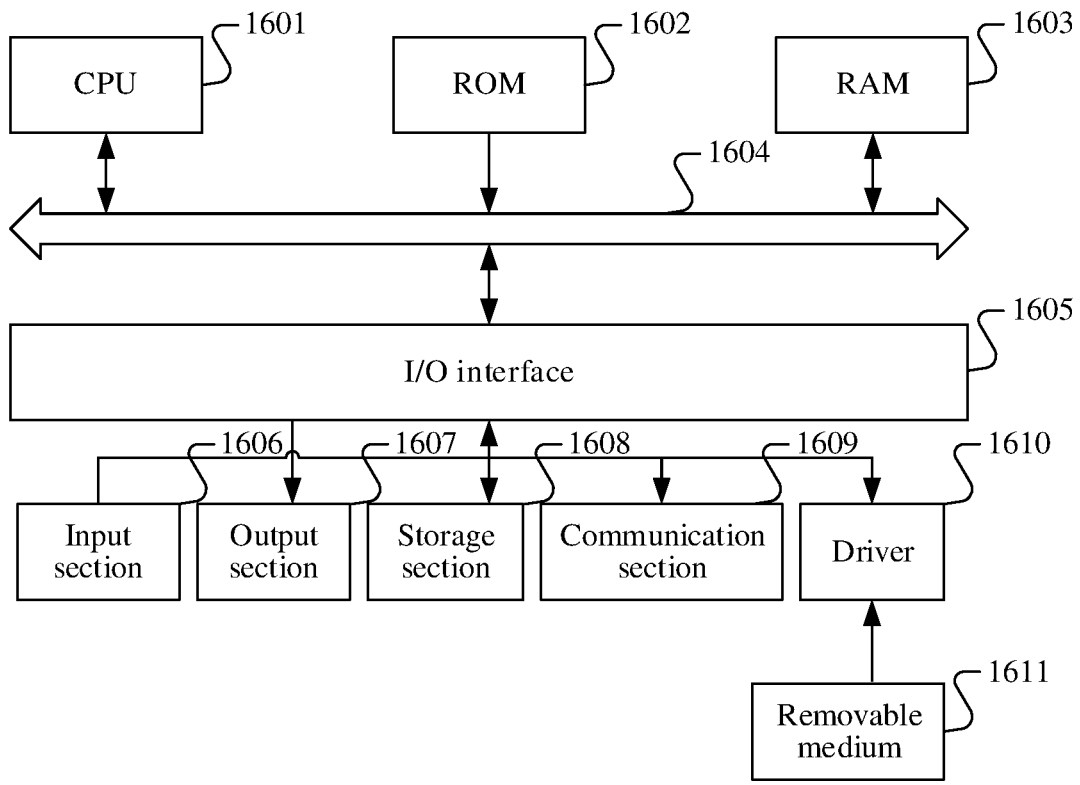
FIG. 8 is a schematic structural diagram of a computer system adapted to implement an electronic device according to an embodiment of the present disclosure.

FIG. 8 is a schematic structural diagram of a computer system adapted to implement an electronic device according to an embodiment of the present disclosure.

The computer system 1600 of the electronic device shown in FIG. 8 is merely an example, and does not constitute any limitation on functions and use ranges of the embodiments of the present disclosure.

As shown in FIG. 8, the computer system 1600 includes a central processing unit (CPU) 1601, which may perform various suitable actions and processing on the basis of a program stored in a read-only memory (ROM) 1602 or a program loaded from a storage section 1608 into a random access memory (RAM) 1603, for example, perform the method described in the foregoing embodiments. The RAM 1603 further stores various programs and data required for system operations. The CPU 1601, the ROM 1602, and the RAM 1603 are connected to each other through a bus 1604. An input/output (I/O) interface 1605 is also connected to the bus 1604.

The following components are connected to the I/O interface 1605: an input section 1606 including a keyboard, a mouse, and the like; an output section 1607 such as a cathode ray tube (CRT), a liquid crystal display (LCD), and a speaker; a storage section 1608 including a hard disk and the like; and a communication section 1609 of a network interface card such as a local area network (LAN) card and a modem. The communication section 1609 performs communication processing over a network such as the Internet. A driver 1610 is also connected to the I/O interface 1605 as required. A removable medium 1611, such as a magnetic disk, an optical disc, a magneto-optical disk, and a semi-conductor memory, is installed on the driver 1610 as required, so that a computer program read from the removable medium is installed into the storage section 1608 as required.

Particularly, according to the embodiments of the present disclosure, the process described above with reference to the flowchart may be implemented as a computer software program. For example, an embodiment of the present disclosure includes a computer program product, including a computer program loaded in a computer-readable medium, the computer program including a computer program used for performing the method shown in the flowchart. In such an embodiment, the computer program may be downloaded and installed from a network through the communication section 1609, and/or installed from the removable medium 1611. When the computer program is executed by the CPU 1601, the various functions defined in the system of the present disclosure are executed.

The computer-readable medium shown in the embodiments of the present disclosure may be a computer-readable signal medium or a computer-readable storage medium or any combination of the two. The computer-readable storage medium may be, for example, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, the computer-readable signal medium may include a data signal transmitted in a baseband or as part of a carrier, and loads a computer-readable computer program. A data signal propagated in such a way may employ a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included in the computer-readable medium may be transmitted by using any suitable medium, including but not limited to: wireless, wired, etc., or any suitable combination thereof.

The flowcharts and block diagrams in the accompanying drawings illustrate possible system architectures, functions and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing specified logic functions. In some alternative implementations, functions annotated in boxes may occur in a sequence different from that annotated in an accompanying drawing. For example, two blocks shown in succession may, in fact, be executed substantially concurrently, or the blocks may sometimes be executed in the reverse order, depending upon the functionality involved. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the present disclosure may be implemented in a software manner, or may be implemented in a hardware manner, and the unit described can also be set in a processor. Names of the units do not constitute a limitation on the units in a specific case.

According to another aspect of the present disclosure, further provided is a computer-readable storage medium, having a computer program stored thereon, the computer program, when executed by a processor, implementing the method according to the foregoing embodiments. The computer-readable storage medium may be included in the electronic device described in the foregoing embodiments, or may exist alone and is not disposed in the electronic device.

Although a plurality of modules or units of a device configured to perform actions are discussed in the foregoing detailed description, such division is not mandatory. Actually, according to the implementations of the present disclosure, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the implementations of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the method according to the embodiments of the present disclosure.

After considering the description and practicing the implementations of the present disclosure, a person skilled in the art may easily conceive of other implementations of the present disclosure. The present disclosure is intended to cover any variations, uses, or adaptive changes of the present disclosure. These variations, uses, or adaptive changes follow the general principles of the present disclosure and include common general knowledge or common technical means in the art, which are not disclosed in the present disclosure.

It is to be understood that the present disclosure is not limited to the precise structures described above and shown in the accompanying drawings, and various modifications and changes can be made without departing from the scope of the present disclosure. The scope of the present disclosure is subject only to the appended claims.

What is claimed is:

1. A game data updating method, executed by a container in an electronic device, and comprising:
    running a cloud gaming client mirroring data when a game update is to be performed, to generate a cloud gaming picture comprising an update trigger control;
    obtaining operation coordinates corresponding to the update trigger control;
    automatically simulating a trigger operation on the update trigger control according to the operation coordinates corresponding to the update trigger control, to generate a trigger instruction for the update trigger control;
    updating the cloud gaming client mirroring data according to the trigger instruction;
    capturing, in a process of updating the cloud gaming client mirroring data, a screenshot of the cloud gaming picture generated in the process to obtain a first captured image;
    converting an image format of the first captured image, and transmitting the first captured image in a converted image format to a user interface identification server; and
    receiving an update completion instruction transmitted by the user interface identification server, the update completion instruction being generated by the user interface identification server in response to identifying, in the first captured image in the converted image format, an update completion control representing completion of the update, and the update completion instruction indicating that the update of the cloud gaming client mirroring data is completed.

2. The game data updating method according to claim 1, further comprising:

obtaining version information of the cloud gaming client mirroring data transmitted by a mirroring management server; and obtaining the cloud gaming client mirroring data from an image server according to the version information.

3. The game data updating method according to claim 2, further comprising:

packaging, after the update is completed, an updated cloud gaming client mirroring data; and transmitting a packaged cloud gaming client mirroring data to the image server.

4. The game data updating method according to claim 1, wherein the capturing a screenshot of the cloud gaming picture generated in the process to obtain a first captured image comprises:

capturing, according to a preset time interval, a screenshot of the cloud gaming picture generated in the process to obtain the first captured image, the first captured image being a captured image set comprising one or more images; or, capturing, according to a preset time interval when an update progress bar in the cloud gaming picture generated in the process reaches a first progress, a screenshot of the cloud gaming picture generated in the process, and capturing, when the update progress bar reaches a second progress, a screenshot of the cloud gaming picture generated in the process in real time to obtain the first captured image, the first captured image being a captured image set comprising one or more images.

5. The game data updating method according to claim 1, wherein the obtaining operation coordinates corresponding to the update trigger control comprises:

capturing, in a process of running the cloud gaming client mirroring data, a screenshot of the cloud gaming picture to obtain a target captured image;

converting an image format of the target captured image, and transmitting the second captured image in a converted image format to a user interface identification server, so that the user interface identification server identifies the update trigger control in the target captured image in the converted image format, and determines operation coordinates corresponding to the identified update trigger control; and receiving the operation coordinates corresponding to the update trigger control and transmitted by the user interface identification server.

6. The game data updating method according to claim 1, wherein the updating the cloud gaming client mirroring data according to the trigger instruction comprises:

replacing, according to pre-loaded cloud gaming update content when the trigger instruction is detected, content to be updated comprised in the cloud gaming client mirroring data.

7. The game data updating method according to claim 1, further comprising:

transmitting an update state indicating an update node of the cloud gaming client mirroring data to the mirroring management server, the update node of the cloud gaming client mirroring data comprising a cloud gaming server.

8. A game data updating system, comprising a cloud gaming server and a user interface identification server, each server comprising at least one memory and at least one processor coupled to the at least one memory:

the cloud gaming server is configured to run, when a game update is to be performed, a cloud gaming client mirroring data to generate a cloud gaming picture comprising an update trigger control, and transmit the cloud gaming picture to the user interface identification server;

the user interface identification server is configured to identify the update trigger control in the cloud gaming picture, determine operation coordinates corresponding to the identified update trigger control, and transmit the operation coordinates to the cloud gaming server; and the cloud gaming server is further configured to:

automatically simulate a trigger operation on the update trigger control according to the operation coordinates corresponding to the update trigger control, to generate a trigger instruction for the update trigger control, and update the cloud gaming client mirroring data according to the trigger instruction; and capture a screenshot of the cloud gaming picture to obtain a captured image, convert an image format of the captured image, and transmit the captured image in a converted image format to the user interface identification server, wherein the user interface identification server is further configured to:

obtain an interface identifier corresponding to the cloud gaming client mirroring data;

when the captured image in the converted image format is identified as an update interface according to the interface identifier, mark the operation coordinates corresponding to the update trigger control in the update interface; and when the captured image in the converted image format is identified as a login interface according to the interface identifier, mark a login control in the login interface, generate an update completion instruction, and transmit the update completion instruction to the cloud gaming server.

9. The game data updating system according to claim 8, further comprising an image server, wherein the cloud gaming server is further configured to obtain version information of the cloud gaming client mirroring data transmitted by a mirroring management server, and obtain the cloud gaming client mirroring data from the image server according to the version information of the cloud gaming client mirroring data.

10. The game data updating system according to claim 9, wherein after the update of the cloud gaming client mirroring data is completed, the cloud gaming server is further configured to package an updated cloud gaming client mirroring data, and transmit a packaged cloud gaming client mirroring data to the image server.

11. The game data updating system according to claim 8, wherein the cloud gaming server is further configured to:

capture, according to a preset time interval, a screenshot of the cloud gaming picture generated in the process to obtain the first captured image, the first captured image being a captured image set comprising one or more images; or, capture, according to a preset time interval when an update progress bar in the cloud gaming picture generated in the process reaches a first progress, a screenshot of the cloud gaming picture generated in the process, and capture, when the update progress bar reaches a second progress, a screenshot of the cloud gaming picture generated in the process in real time to obtain the first captured image, the first captured image being a captured image set comprising one or more images.

12. The game data updating system according to claim 8, wherein the cloud gaming server is further configured to:
    capture, in a process of running the cloud gaming client mirroring data, a screenshot of the cloud gaming picture to obtain a target captured image;
    convert an image format of the second captured image, and transmitting the target captured image in a converted image format to a user interface identification server, so that the user interface identification server identifies the update trigger control in the target captured image in the converted image format, and determines operation coordinates corresponding to the identified update trigger control; and
    receive the operation coordinates corresponding to the update trigger control and transmitted by the user interface identification server.

13. The game data updating system according to claim 8, wherein the cloud gaming server is further configured to:
    replace, according to pre-loaded cloud gaming update content when the trigger instruction is detected, content to be updated comprised in the cloud gaming client mirroring data.

14. The game data updating system according to claim 8, wherein the cloud gaming server is further configured to:
    transmit an update state indicating an update node of the cloud gaming client mirroring data to the mirroring management server, the update node of the cloud gaming client mirroring data comprising a cloud gaming server.

15. A non-transitory computer-readable storage medium, having computer-readable instructions stored thereon, the computer-readable instructions, when executed by at least one processor of a computer, causing the at least one processor to perform:
    running a cloud gaming client mirroring data when a game update needs to be performed, to generate a cloud gaming picture comprising an update trigger control;
    obtaining operation coordinates corresponding to the update trigger control;
    automatically simulating a trigger operation on the update trigger control according to the operation coordinates corresponding to the update trigger control, to generate a trigger instruction for the update trigger control;
    updating the cloud gaming client mirroring data according to the trigger instruction;
    capturing, in a process of updating the cloud gaming client mirroring data, a screenshot of the cloud gaming picture generated in the process to obtain a first captured image;
    converting an image format of the first captured image, and transmitting the first captured image in a converted image format to a user interface identification server; and
    receiving an update completion instruction transmitted by the user interface identification server, the update completion instruction being generated by the user interface identification server in response to identifying, in the first captured image in the converted image format, an update completion control representing completion of the update, and the update completion instruction indicating that the update of the cloud gaming client mirroring data is completed.

16. The storage medium according to claim 15, wherein the computer-readable instructions further cause the at least one processor to perform:
    obtaining version information of the cloud gaming client mirroring data transmitted by a mirroring management server; and
    obtaining the cloud gaming client mirroring data from an image server according to the version information.

17. The storage medium according to claim 16, wherein the computer-readable instructions further cause the at least one processor to perform:
    packaging, after the update is completed, an updated cloud gaming client mirroring data; and
    transmitting a packaged cloud gaming client mirroring data to the image server.

* * * * *